（12）United States Patent
Kovatchev

(10) Patent No.: US 12,108,506 B2
(45) Date of Patent: Oct. 1, 2024

(54) CIRCUIT ARRANGEMENT FOR AN LED MATRIX LIGHT

(71) Applicant: Continental Automotive Technologies GmbH, Hannover (DE)

(72) Inventor: Emil Kovatchev, Vienna (AT)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/915,902

(22) PCT Filed: Mar. 31, 2021

(86) PCT No.: PCT/EP2021/058468
§ 371 (c)(1),
(2) Date: Sep. 29, 2022

(87) PCT Pub. No.: WO2021/198349
PCT Pub. Date: Oct. 7, 2021

(65) Prior Publication Data
US 2023/0145357 A1    May 11, 2023

(30) Foreign Application Priority Data

Apr. 1, 2020  (DE) .................... 10 2020 204 268.3
May 12, 2020 (DE) .................... 10 2020 205 960.8

(51) Int. Cl.
*H05B 45/30*     (2020.01)
*H05B 45/36*     (2020.01)
*H05B 45/48*     (2020.01)

(52) U.S. Cl.
CPC ............. *H05B 45/48* (2020.01); *H05B 45/36* (2020.01)

(58) Field of Classification Search
CPC ...... H05B 45/30; H05B 45/32; H05B 45/325; H05B 45/36; H05B 45/40; H05B 45/48; H05B 47/10
See application file for complete search history.

(56) References Cited

U.S. PATENT DOCUMENTS 8,203,283 B2    6/2012  Hoogzaad
2011/0210674 A1* 9/2011  Melanson .............. H05B 45/48
                                              315/185 R
(Continued)

FOREIGN PATENT DOCUMENTS

DE    102009025752 A1    12/2010
DE    102014118795 A1     6/2015
(Continued)

OTHER PUBLICATIONS

"Audi A8 erstrahlt in neuem Licht.", http://www.audi.de/content/de/brand/de/vorsprung_durch_technik/content/2013/08/Audi-A8-erstrahlt-in-neuem-Licht.html, Audi, 2013.
(Continued)

*Primary Examiner* — Jimmy T Vu

(57) ABSTRACT

A circuit arrangement comprises an LED chain comprising multiple LEDs; and bypass switching elements, wherein each LED is assigned to one of the bypass switching elements, and the bypass switching elements each have a driver terminal, wherein each of the bypass switching elements is configured to bypass the LED of the LED chain that is associated with the bypass switching element based on a voltage at the driver terminal that is associated with the bypass switching element; and a switch, wherein the driver terminals of the bypass switching elements are connected to the switch via a common node, the switch being configured to discharge a capacitor of a constant current source that can (Continued)

be connected to the LED chain based on a voltage applied to the node. A circuit comprises the circuit arrangement.

20 Claims, 2 Drawing Sheets

(56) References Cited

U.S. PATENT DOCUMENTS

| | | |
|---|---|---|
| 2011/0285317 A1 | 11/2011 | Grebner |
| 2013/0313973 A1 | 11/2013 | DeNicholas et al. |
| 2015/0173133 A1 | 6/2015 | Seki et al. |

FOREIGN PATENT DOCUMENTS

| | | |
|---|---|---|
| DE | 202017100741 U1 | 2/2017 |
| DE | 102017200490 B3 | 2/2018 |

OTHER PUBLICATIONS

"High-Brightness LED Matrix Manager for Automotive Headlight Systems", Texas Instruments, 2016, Dallas, Texas.

International Search Report and Written Opinion dated Jun. 18, 2021 from corresponding International patent application No. PCT/EP2021/058468.

Machine translation of "Audi A8 erstrahlt in neuem Licht.", http://www.audi.de/content/de/brand/de/vorsprung_durch_technik/content/2013/08/Audi-A8-erstrahlt-in-neuem-Licht.html, Audi, 2013.

* cited by examiner

CIRCUIT ARRANGEMENT FOR AN LED MATRIX LIGHT

The invention relates to a circuit arrangement, in particular for a light-emitting diode (LED) matrix light, and to a circuit in which a constant current source and supply voltage are connected to the circuit arrangement.

LEDs (light-emitting diodes) are increasingly being used for lighting purposes thanks to their efficiency, compact and robust design and longevity.

LEDs are usually operated with a constant current, which is why LED series circuits are particularly suitable for the economical operation of several LEDs with just one constant current source. There may be the need for individual LED pixel control, for example in automotive applications, in order to implement matrix light functions.

US 2013/0313973 A1 discloses a method of addressing the LEDs individually and cost-effectively by diverting the LED current on request, for example by means of pulse-width modulation (PWM), in particular dimming PWM, through FETs connected in parallel with the LEDs in order to turn the corresponding LEDs on and off. Some chip manufacturers offer highly integrated IC drivers that support LED bypass control.

This creates a problem: in the phases in which the LED chain is "shortened" as it were by bridging individual LEDs (since an element in the chain is missing), the voltage drops rapidly and the energy stored in the capacitor C1 accompanying the constant current source inevitably leads to an LED current overshoot. The LED current rises suddenly, as it were.

The capacitor associated with the constant current source is therefore necessary because it reduces the current ripple in the LED supply lines (relevant for electromagnetic compatibility (EMC)) and in the LEDs themselves. Capacitor values can range from 1 µF to 4.7 µF. However, these values can lead to highly pronounced LED current peaks, which can damage the design of the LEDs. In this case, current peak values of the power LEDs of a maximum of 1 A to 3 A are provided.

U.S. Pat. No. 8,203,283 B2 relates to the overcurrent problem when dynamically bypassing the LEDs in a chain comprising a parallel capacitor—namely the LED current peak that occurs at the moment the output voltage is reduced. Here, the capacitor associated with the constant current source is replaced by several capacitors connected in parallel with the individual LEDs. The discharging of these capacitors is done by switches provided individually for this purpose. The formation of the LED current peaks is thus prevented.

This solution is simple and efficient, but it has particular disadvantages. It is physically difficult to populate multiple capacitors in parallel with the individual LEDs, for example in the case that they, together with the bypass switches, are placed on their own LED substrate PCBs (printed circuit boards) from different electronics manufacturers.

Furthermore, the total capacitance that the driving LED current source (for example a buck controller) sees at its output may be variable. The total capacitance decreases as the output voltage and power increase, since several capacitors are connected in series at the converter output. This contradicts EMC and stability considerations, namely good buffer storage and low output ripple.

In addition, the discharge currents of the "distributed" capacitors at high output powers represent an additional load for the bypass switches, which can potentially destroy the bypass FETs with capacitance values of 470 nF to 1 µF and higher.

In contrast to U.S. Pat. No. 8,203,283 B2, the capacitor as the output capacitor of the constant current source is therefore arranged directly in the power section of the corresponding LED driver (usually a buck converter) in order to guarantee minimal current loops and thus minimal electromagnetic emissions. However, U.S. Pat. No. 8,203,283 B2 suggests that the distributed capacitor be placed with the LEDs or bypass switches rather than with the converter itself.

The object of the present invention is to at least partially eliminate these disadvantages. In particular, the current overshoot should be limited.

This object is achieved by a circuit arrangement. The circuit arrangement has a light-emitting diode (LED) chain. The LED chain has several LEDs. The circuit arrangement also has bypass switching elements. Each LED of the LED chain is assigned to one of the bypass switching elements. Furthermore, the bypass switching elements each have a driver terminal. Each of the bypass switching elements is designed to bypass the LED of the LED chain that is associated with the bypass switching element based on a voltage at the driver terminal that is associated with the bypass switching element. The circuit arrangement also has a switch. The driver terminals of the bypass switching elements are connected to the switch via a common node. The switch is designed to discharge a capacitor of a current source, for example a constant current source, that can be connected, is to be connected or is connected to the LED chain based on a voltage applied to the node.

This permits the current increase to be significantly reduced. Output ripples can also be reduced as a result.

The bypass switching elements may be bypass switches that are provided to bypass the associated LED in terms of current, such that no current or a very small current flows through the associated LED. The bypassing can be provided by a PWM connected to the driver terminal. The PWMs can work together to assign a light function, in the sense of an illumination function, to one of the LED chains. This allows different light patterns to be achieved by switching individual LEDs on and/or off.

The switch may be a component that can set two states: on and off. For example, in one state, the capacitor of the current source that is to be connected/is able to be connected to the LED chain can be connected to a ground potential via the switch. In the other state, the capacitor of the current source that is to be connected/is able to be connected to the LED chain can be (DC) isolated from the ground potential by means of the switch.

The LED chain can be understood in such a way that the LEDs are connected in succession. Consecutive LEDs of the LED chain can each share a connecting point.

A light-emitting diode (LED) may be present in the form of at least one individually housed LED or in the form of at least one LED chip that has one or more light-emitting diodes, or in the form of a micro-LED or a nano-LED (smart dust). A plurality of LED chips can be mounted on a common substrate ("submount") and form an LED, or they can be attached individually or together, for example to a circuit board (e.g. FR4, metal-core circuit board, etc.) ("CoB"=chip on board). The at least one LED can be equipped with at least one separate and/or common optical unit for beam guidance, for example with at least one Fresnel lens or a collimator. Instead of or in addition to inorganic LEDs, for example based on AlInGaN or InGaN or AlInGaP, organic LEDs (OLEDs, e.g. polymer OLEDs) can generally also be used.

The LED chips can be directly emitting or have an upstream phosphor.

Alternatively, the light emitting component can be a laser diode or a laser diode arrangement. It is also conceivable to provide an OLED light-emitting layer or a plurality of OLED light-emitting layers or an OLED light-emitting region. The emission wavelengths of the light-emitting components can be in the ultraviolet, visible or infrared spectral range. The LED chips can emit white light in the standardized ECE white field of the automotive industry, implemented for example by a blue emitter and a yellow/green converter.

Particularly advantageous configurations can be found in the dependent claims.

In particular, a resistor and a diode can be connected in series between each driver terminal of the bypass elements and the node. Furthermore, an anode of the diode can be connected to the node.

A voltage detector in the form of a diode may thus be provided to effectively be able to actuate the switch.

In a further configuration, the switch may be a field-effect transistor (FET). The driver terminals of the bypass switching elements can be connected to a gate terminal of the FET via the common node.

This permits a power-saving switch to be integrated into the circuit arrangement.

Furthermore, a drain terminal of the FET can be connected to a parallel circuit composed of a capacitor and a resistor. The FET can be designed to discharge, via the parallel circuit, the capacitor of the current source that can be connected, is to be connected or is connected to the LED chain based on the voltage applied to the node.

The discharge speed of the capacitor of the current source that can be connected, is to be connected or is connected to the LED chain can be set by selecting the RC parallel circuit or the associated time constant.

A source terminal of the FET can also be connected to the ground potential. This permits an effective switch to be provided.

A differentiator can be connected between the switch and the node. A gate driver can also be placed between the differentiator and the switch. The gate driver can be designed to amplify the output signal of the differentiator and pass it on to the switch in order to actuate said switch. In this case, the differentiator can have an operational amplifier/comparator. The operational amplifier/comparator may be able to be connected to a supply voltage. The operational amplifier/comparator can have two input terminals. One input terminal can be designed to be supplied with a reference voltage. The other input terminal can be connected to a high-pass filter.

An improved upstream connection of the switch can be provided as a result.

Likewise, the circuit arrangement can also have a resistor. A first terminal of the resistor can be connected to the node. A second terminal of the resistor can be provided to be connected or to be able to be connected to the supply voltage.

In this way, suitable voltage detection can be provided by means of this resistor and the series circuit composed of the resistor and diode of each branch leading from the node to the driver terminal in order to detect the voltage state of the driver circuits and to switch the switch according to this state, such that the capacitor of the current source can be discharged via the switch without generating an overcurrent through the LEDs. The node can be located exactly between the resistor to be connected to the supply voltage and the series circuit composed of the resistor and the diode of each branch leading from the node to the driver terminal.

The high-pass filter can have a capacitor and a resistor. The capacitor can be connected between the node and the other input terminal of the operational amplifier/comparator. The resistor can be connected between the other input terminal of the operational amplifier/comparator and the ground potential. This is how the differentiator works.

Furthermore, operating voltage terminals of the operational amplifier/comparator can be designed to be connected to the supply voltage or to the ground potential accordingly. For example, one operating terminal is thus connected to the ground potential and the other operating terminal is thus connected to the supply voltage.

In this case, the voltage at the respective driver terminal can refer to the ground potential. The voltages at the driver terminals can also be equal.

This object is also achieved by a circuit. The circuit has a circuit arrangement as described above. Furthermore, the circuit can have the above-mentioned current source and the above-mentioned supply voltage. In the case of the circuit, both are connected to the corresponding connection points of the circuit arrangement, as described above and as is also clear to a person skilled in the art. The supply voltage can thus be connected directly to the components defined above. This also applies to the current source and the associated capacitor.

It is clear to a person skilled in the art that the explanations set forth herein may be implemented using hardware circuits, software means, or a combination thereof. The software means may be associated with programmed microprocessors or a general computer, an ASIC (application-specific integrated circuit) and/or DSPs (digital signal processors).

For example, the current source, in particular the constant current source, and the driver circuit or the bypass switching elements can be realized in part as a computer, a logic circuit, an FPGA (field-programmable gate array), a processor (for example comprising a microprocessor, a microcontroller (μC) or a vector processor)/core (that can be integrated in the processor or used by the processor)/CPU (central processing unit; wherein several processor cores are possible), an FPU (floating point unit), an NPU (numerical processing unit), an ALU (arithmetic logic unit), a coprocessor (additional microprocessor to support a main processor (CPU)), a GPGPU (general purpose computation on graphics processing unit), a parallel computer (for simultaneously executing arithmetic operations, inter alia on multiple main processors and/or graphics processors), or a DSP.

Even if some of the aspects described above have been described in relation to the circuit arrangement, these aspects can also apply to the circuit. Likewise, the aspects described above in relation to the circuit can apply to the circuit arrangement in a corresponding manner.

If a component "is connected" to another component here, it may mean that it is directly connected thereto or directly accesses it; it should be noted, however, that there may be another component in between. On the other hand, if a component is "directly connected" to another component, it means that there are no other components in between.

The invention shall be more particularly elucidated hereinbelow with reference to an exemplary embodiment. In the figures.

Figure 1:
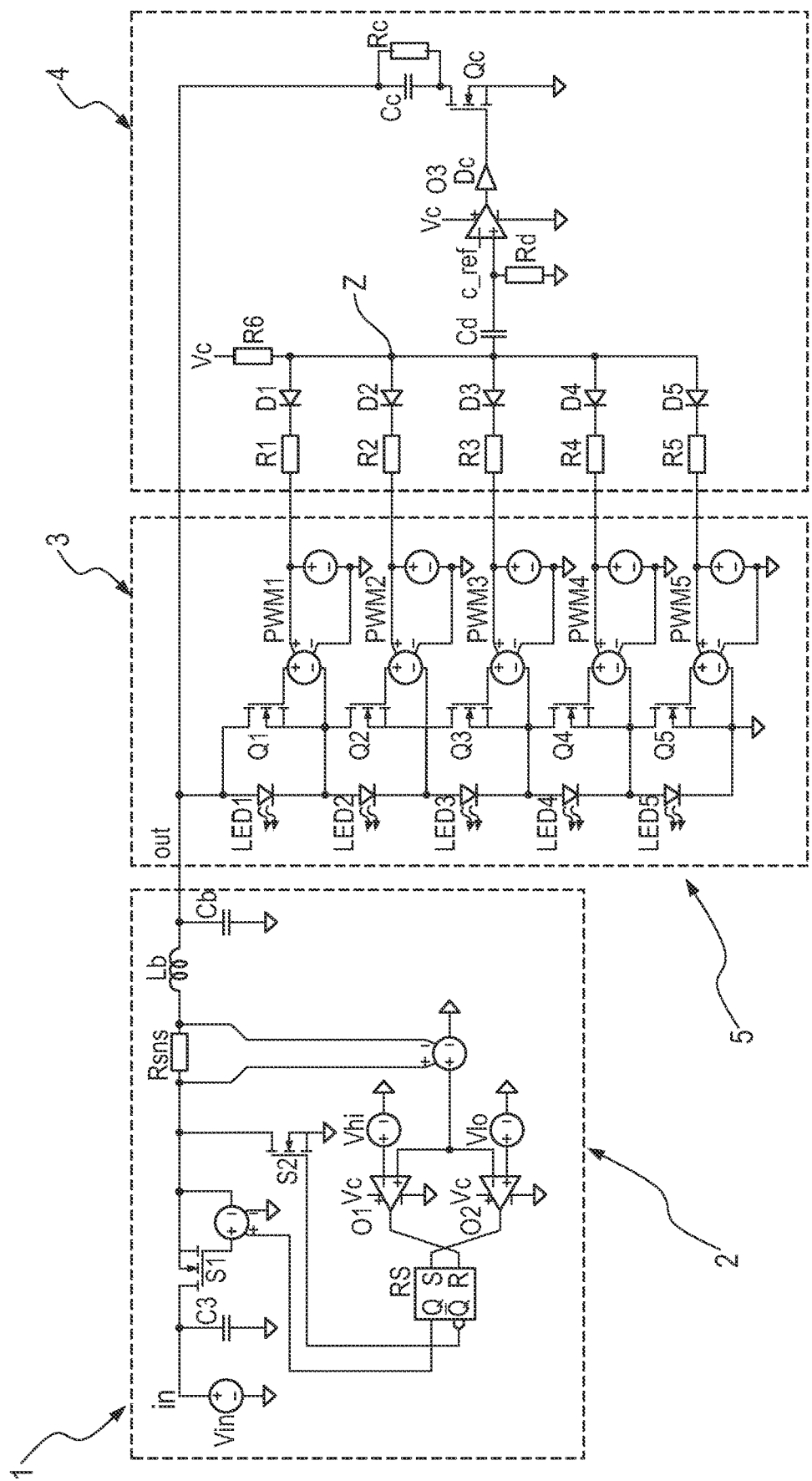
FIG. 1 shows a schematic illustration of a circuit with a constant current source and a circuit arrangement provided therefor.

The figures are only schematic in nature and serve exclusively for understanding the invention. Further details and aspects are mentioned in connection with the embodiments described above or below. The embodiment shown in FIG. 1 may have one or more optional additional features corresponding to one or more aspects mentioned in connection with the concept proposed above in relation to the embodiments described above.

In addition, spatially relative terms such as "beneath", "under", "lower", "above", "upper", "left", "left-hand", "right", "right-hand" and the like, can be used here to simply describe the relationship of one element or structure to one or more other elements or structures depicted in the figures. The spatially relative terms are intended to encompass other orientations of the component in use or operation in addition to the orientation depicted in the figures. The component may be oriented differently (rotated 90 degrees or in a different orientation) and the spatially relative descriptors used herein can be interpreted accordingly as well.

The circuit arrangement 5 and the circuit 1 will now be described based on one embodiment.

The principle of the present invention is to use suitable electronic circuitry, referred to herein as circuit arrangement 5, to reduce an amplitude of the LED current peak that occurs during dynamic bypassing of individual LEDs in a chain (LED1, LED2, LED3, LED4, LED5) until the LED specification is met in terms of the permissible peak LED current.

The circuit 5 for detecting the peak LED currents operates as follows. The pulse-width-modulation (PWM) voltage sources (PWM1, PWM2, PWM3, PWM4, PWMS), also referred to herein as driver terminals, which drive the bypass transistors (Q1, Q2, Q3, Q4, Q5), which can also be designed herein at least in part as bypass switching elements, (these may be microcontroller pins, in particular timer outputs) are connected by resistors (R1, R2, R3, R4, R5) and diodes (D1, D2, D3, D4, D5) to the resistor R6.

The superposition of the currents through the resistors (R1, R2, R3, R4, R5), caused by the timings of the PWM signals (PWM1, PWM2, PWM3, PWM4, PWMS), creates a voltage swing at the resistor R6. The voltage at the anodes of (D1, D2, D3, D4, D5) thus provides the information about each rising or falling edge of the PWM signals (PWM1, PWM2, PWM3, PWM4, PWMS). This voltage can then be evaluated via the differentiator Cd, Rd and the comparator/operational amplifier O3 in such a way that every time an LED bypass transistor (Q1, Q2, Q3, Q4, Q5) is driven (PWMx is set to "high") and the LED chain voltage is forcibly shortened as a result, a positive voltage pulse is generated at the output of the comparator O3. This pulse is designated by the gate driver Dc, amplified and drives the FET Qc.

The role of the FET Qc is to quickly discharge the capacitor Cb, which is connected in parallel with the LED chain (LED1, LED2, LED3, LED4, LED5), via the capacitor Cc and the resistor Rc, and thus to prevent the LED overcurrent in the case of the inevitable shortening of the LED chain.

The output capacitor Cb of the constant current converter or the constant current source 2 is discharged by the FET Qc and the RC element composed of the capacitor Cc and the resistor Rc.

By fine tuning the time constant of the RC element, the discharge depth and speed can be adapted to specific LED current requirements. The duration of the discharge pulses, on the other hand, can be set by appropriate selection of the differentiator components Cd, Rd and the comparator reference c_ref in such a way that the LED overcurrent is reduced to the desired extent.

A major advantage of this LED current peak detector circuit 4 is that it does not need any information about the timings (pulse width, frequency or phase offset) of the individual PWM signals (PWM1, PWM2, PWM3, PWM4, PWM5) in order to derive the information when LED chain "shortening" occurs and based on this a current peak results. The proposed LED current peak detector circuit 4 is therefore independent of the application software that controls the individual PWMs (PWM1, PWM2, PWM3, PWM4, PWM5).

The pulse duration, period and phase offset of the PWM signals (PWM1, PWM2, PWM3, PWM4, PWM5) can be deliberately chosen in such a way that the control pulses often "overlap" and thus often cause LED chain shortenings and LED overcurrents in the LED bypass circuit 3.

At each falling edge of the LED chain voltage V(out), a control pulse is generated by the gate driver Dc for the discharge FET Qc, namely at the gate of the FET Qc.

The length of the control pulse is proportional to the negative voltage swing of the chain voltage V(out) and is derived from the anode voltage of the diodes (D1, D2, D3, D4, D5) and converted by the differentiator Cd, Rd to the voltage that is fed to the comparator O3. Using a suitable reference voltage c_ref, the comparator O3 generates the control pulse for the downstream FET Qc.

In this example, the LED chain (LED1, LED2, LED3, LED4, LED5) is driven by the constant current source 2, also referred to as a "hysteresis buck converter". For example, however, this could also be a boost or SEPIC converter or an active current source, formed for example with operational amplifiers and transistors. The number of LEDs per "segment", that is to say the number of LEDs between the drain and source of one of the FETs (Q1, Q2, Q3, Q4, Q5), may also be greater than one. This can then cause an even greater voltage swing and LED overcurrent. The capacitor Cb that is responsible for LED ripple current limitation and EMC performance is connected in parallel with the current source. The capacitor Cb may be regarded as part of the constant current source 2 or may be part of it. The following elements, among others, as can be seen in FIG. 1, can form part of the constant current source 2. An input voltage Vin for generating an input current (in), an input capacitor C3, a first switch S1, a second switch S2, a first comparator O1, a second comparator O2 which are connected accordingly to a high voltage Vhi and a low voltage Vlo and are fed by a supply voltage Vc, a flip-flop RS, a resistor Rsns and a coil Lb.

The LEDs (LED1, LED2, LED3, LED4, LED5) are bypassed by the parallel switches (Q1, Q2, Q3, Q4, Q5) in order to be able to implement the dimming PWMs (PWM1, PWM2, PWM3, PWM4, PWM5) in an LED matrix control system.

Figure 2:
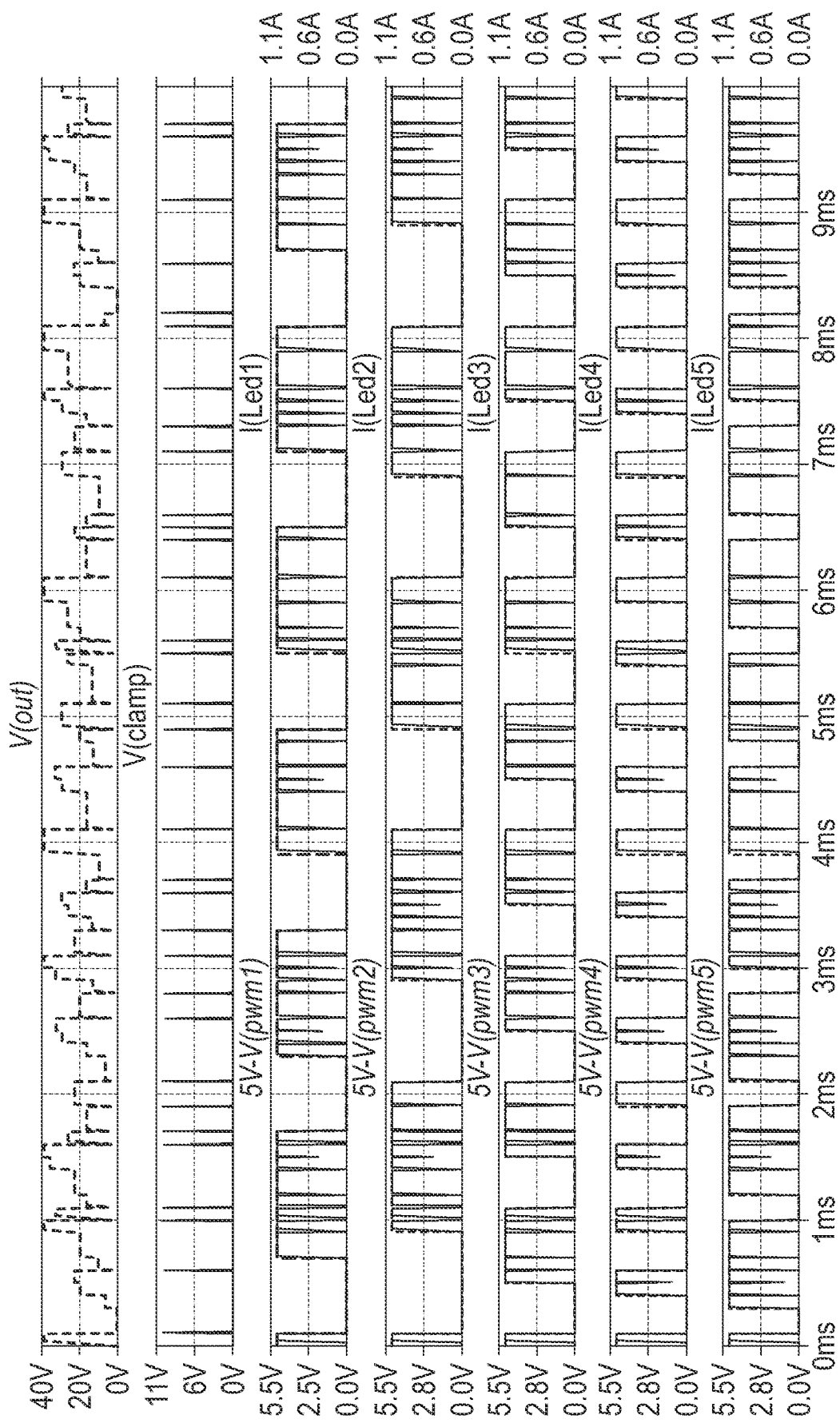
FIG. 2 shows a schematic illustration of a simulation when the circuit arrangement is used.

FIG. 2 shows a schematic illustration of a simulation using the circuit arrangement 5 mentioned in FIG. 1.

This simulation shows that, by using the proposed circuit arrangement 5, the LED current specification is maintained without overcurrent peaks. With each falling edge of the LED chain voltage V(out), which corresponds to a shortening of the LED chain, a short discharge pulse is generated, which discharges the output capacitor of the constant current converter and thus prevents overcurrent peaks. The energy stored in the output capacitor Cb is thereby converted into heat in the FET Qc.

Exemplary values for the individual components may be as follows: Lb at 22 µH, Cb at 1 µF I_LED at 1A R1, R2, R3, R4, R5 at 5 kΩ, R6 at 5 kΩ, D1, D2, D3, D4, D5 as 1N914, Cd at 330 pF, Rd at 10 kΩ, c_ref at 75 mV, Cc at 10 µF, Rc at 10Ω, Qc as N-FET, 90 mΩ, 6 nC, LED1 at 3 pcs, LED2 at 2 pcs, LED3 at 2 pcs, LED4 at 4 pcs, LED5 at 1 pcs.

The power dissipation may be in the range of 1 W, for example about 1.1 W.

The effectiveness of the circuit arrangement 5 is significantly improved by the connection between the resistor Rc, the capacitor Cc and the capacitor Cb.

It should be noted that the constant current source 2 driving the LEDs (LED1, LED2, LED3, LED4, LED5), for example a DC-DC converter or another active current source, is designed to work with a short circuit at the output since the proposed circuit arrangement 5 short-circuits the output through the Rdson of the FET Qc in order to convert the energy stored in the output capacitor Cb into heat as quickly as possible.

The hysteresis buck converter shown here meets this requirement. The frequency of the coil current I(Lb) changes depending on the amplitude of the LED chain voltage V(out) and becomes lower when the output is short-circuited. However, the LED currents I(LED1, LED2, LED3, LED4, LED5) remain corrected at a value, for example 1 A, even with a different residual ripple, due to the variable frequency of the coil current.

The circuit arrangement 5 offers the following advantages.

The proposed circuit arrangement 5 eliminates the LED current peaks quickly and effectively. Peak LED current limitation can thus be provided.

The proposed circuit 5 is cost-effective. The comparator operates close to the ground potential and is therefore inexpensive. Furthermore, the clamp FET Qc can have a high switch-on resistance RDSon. This can save electricity and thus costs.

The proposed circuit arrangement 5 can be designed and optimized depending on the specific situation (number of LEDs, permissible amplitude of the LED currents) for efficiency or more for a limiting effect through suitable selection of the components. This increases the flexibility of the circuit.

The proposed circuit arrangement 5 does not require any information about the timings (pulse width, frequency or phase offset) of the individual PWM signals in order to derive the information as to when LED chain "shortening" occurs and a current peak therefore occurs. It can therefore accordingly be autonomous.

The proposed circuit arrangement 5 can consequently be completely independent of the application software that controls the individual PWMs.

LIST OF REFERENCE SIGNS

Circuit 1
Constant current source 2
LED bypass circuit 3
LED current peak detector circuit 4
Circuit arrangement 5
LED current peak detector circuit 6
LED chain LED1 . . . 5
FETs Q1 . . . 5, S1, Qc
Driver voltages PWM1 . . . 5
Resistors R1 . . . 6, Rc, Rd, Rsns
Diodes D1 . . . 5
Supply voltage Vc
Flip-flop RS
Input voltage Vin
Capacitors C1 . . . 3, Cb, Cd, Cc
Gate driver Dc
Operational amplifier/comparator O1 . . . 3
Coil Lb
Voltage sources Vhi, Vlo
Reference voltage Cref
Common node Z

The invention claimed is:

1. A circuit arrangement, comprising:
an LED chain comprising multiple LEDs;
bypass switching elements, wherein each LED of the LED chain is assigned to one of the bypass switching elements, and the bypass switching elements each have a driver terminal, wherein each of the bypass switching elements is configured to bypass the LED of the LED chain that is associated with the bypass switching element based on a voltage at the driver terminal that is associated with the bypass switching element; and
a switch, wherein the driver terminals of the bypass switching elements are connected to the switch via a common node, wherein the switch is configured to discharge a capacitor of a current source configured to be connected to the LED chain based on a voltage applied to the common node.

2. The circuit arrangement as claimed in claim 1, wherein a resistor and a diode are connected in series between each driver terminal of the bypass switching elements and the common node.

3. The circuit arrangement as claimed in claim 2, wherein an anode of the diode is connected to the common node.

4. The circuit arrangement as claimed in claim 1, wherein the switch is a field-effect transistor, FET, and the driver terminals of the bypass switching elements are connected to a gate terminal of the FET via the common node.

5. The circuit arrangement as claimed in claim 4, wherein a drain terminal of the FET is connected to a parallel circuit composed of a capacitor and a resistor, wherein the FET is configured to discharge, via the parallel circuit, the capacitor of the current source configured to be connected to the LED chain based on the voltage applied to the common node.

6. The circuit arrangement as claimed in claim 4, wherein a source terminal of the FET is connected to a ground potential.

7. The circuit arrangement as claimed in claim 1, wherein a differentiator is connected between the switch and the common node.

8. The circuit arrangement as claimed in claim 7, wherein a gate driver is arranged between the differentiator and the switch and is configured to amplify an output signal of the differentiator and pass it on to the switch and actuate the switch.

9. The circuit arrangement as claimed in claim 7, wherein the differentiator comprises an operational amplifier/comparator that is configured to be connected to a supply voltage, wherein the operational amplifier/comparator comprises two input terminals, wherein one input terminal is configured to be supplied with a reference voltage and the other input terminal is connected to a high-pass filter.

10. The circuit arrangement as claimed in claim 9, wherein the circuit arrangement furthermore has comprises:
a resistor, wherein a first terminal of the resistor is connected to the common node and wherein a second terminal of the resistor is configured to be connected to the supply voltage.

11. The circuit arrangement as claimed in claim 9, wherein the high-pass filter comprises a capacitor and a resistor and wherein the capacitor is connected between the common node and the other input terminal of the operational amplifier/comparator and wherein the resistor is connected between the other input terminal of the operational amplifier/comparator and a ground potential.

12. The circuit arrangement as claimed in claim 9, wherein operating voltage terminals of the operational amplifier/comparator are configured to be connected accordingly to the supply voltage or to a ground potential.

13. The circuit arrangement as claimed in claim 1, wherein the voltage at the respective driver terminal refers to a ground potential.

14. The circuit arrangement as claimed in claim 1, wherein voltages at the driver terminals are equal.

15. A circuit having a current source and a circuit arrangement as claimed in claim 1.

16. The circuit arrangement as claimed in claim 5, wherein a source terminal of the FET is connected to a ground potential.

17. The circuit arrangement as claimed in claim 10, wherein the high-pass filter comprises a capacitor and a resistor and wherein the capacitor is connected between the common node and the other input terminal of the operational amplifier/comparator and wherein the resistor is connected between the other input terminal of the operational amplifier/comparator and a ground potential.

18. The circuit arrangement as claimed in claim 17, wherein operating voltage terminals of the operational amplifier/comparator are configured to be connected accordingly to the supply voltage or to the ground potential.

19. The circuit arrangement as claimed in claim 10, wherein operating voltage terminals of the operational amplifier/comparator are configured to be connected accordingly to the supply voltage or to a ground potential.

20. The circuit arrangement as claimed in claim 11, wherein operating voltage terminals of the operational amplifier/comparator are configured to be connected accordingly to the supply voltage or to the ground potential.

* * * * *